US012674043B2

(12) United States Patent
Yu et al.

(10) Patent No.: US 12,674,043 B2
(45) Date of Patent: Jul. 7, 2026

(54) AMINO SILICONE POLYMER, SILICONE EMULSION COMPRISING SAME, AND METHOD FOR MANUFACTURING SAME

(71) Applicant: KCC Silicone Corporation, Seoul (KR)

(72) Inventors: Hyun Ju Yu, Gyeonggi-do (KR); Cheon Ung Park, Gyeonggi-do (KR)

(73) Assignee: KCC Glass Corporation, Seoul (KR)

(*) Notice: Subject to any disclaimer, the term of this patent is extended or adjusted under 35 U.S.C. 154(b) by 960 days.

(21) Appl. No.: 17/624,533

(22) PCT Filed: Jul. 1, 2020

(86) PCT No.: PCT/KR2020/008582
§ 371 (c)(1),
(2) Date: Jan. 3, 2022

(87) PCT Pub. No.: WO2021/002668
PCT Pub. Date: Jan. 7, 2021

(65) Prior Publication Data

US 2022/0251341 A1 Aug. 11, 2022

(30) Foreign Application Priority Data

Jul. 2, 2019 (KR) ........................ 10-2019-0079600

(51) Int. Cl.
*C08K 13/02* (2006.01)
*C08G 77/16* (2006.01)

(52) U.S. Cl.
CPC .............. *C08K 13/02* (2013.01); *C08G 77/16* (2013.01)

(58) Field of Classification Search
CPC ................................ C08K 13/02; C08G 77/16
See application file for complete search history.

(56) References Cited

U.S. PATENT DOCUMENTS 5,504,149 A 4/1996 Kosal
5,998,537 A 12/1999 Good et al.
6,090,885 A 7/2000 Kuo et al.
6,297,318 B1 10/2001 Halloran et al.
6,316,541 B1 11/2001 Gee
6,465,568 B1 10/2002 Gee et al.
7,300,648 B2 11/2007 Hamachi et al.
7,781,505 B2 8/2010 Cook et al.
8,809,468 B2 8/2014 Mowrer
9,849,309 B2 12/2017 Bouzeloc et al.
10,143,862 B2 12/2018 Billes et al.
10,245,451 B2 4/2019 Bouzeloc et al.
10,576,027 B2 3/2020 Paul et al.
2004/0138373 A1 7/2004 Hamachi et al.
2007/0299178 A1 12/2007 Cook et al.
2012/0269977 A1* 10/2012 Huang .................. C08G 18/61 524/500
2013/0236649 A1 9/2013 Mowrer
2014/0234247 A1 8/2014 Bouzeloc et al.
2014/0294746 A1 10/2014 Billes et al.
2018/0078793 A1 3/2018 Bouzeloc et al.
2018/0353396 A1 12/2018 Paul et al.

FOREIGN PATENT DOCUMENTS

CN 1980987 A 6/2007
CN 104245867 A 12/2014
CN 108289817 A 7/2018
JP H09-132714 5/1997
JP 2000-178358 A 6/2000
JP 3539018 B2 6/2004
JP 2008-511688 A 4/2008
JP 5329084 B2 10/2013
JP 2014-534329 A 12/2014
JP 2019-501981 A 1/2019
KR 10-1999-0058798 A 7/1999
KR 10-2000-0023308 A 4/2000
KR 10-2002-0028773 A 4/2002
KR 10-2004-0015147 A 2/2004
KR 10-2018-0094872 A 8/2018
KR 10-1961487 B1 3/2019

OTHER PUBLICATIONS

Gelest. Silanol-Functional Silicones. https://technical.gelest.com/brochures/reactive-silicones/silanol-functional-polymers/ No date. Accessed on Jul. 30, 2025. (Year: 2025).*
Office Action issued in corresponding Chinese Patent Application No. 202080048184.2 dated Sep. 23, 2022.
International Search Report issued in corresponding International Patent Application No. PCT/KR2020/008582 dated Oct. 30, 2020.
BR search report, Brazilian patent application No. 1120210260960 issued on Oct. 24, 2023.
Examination Report issued in corresponding Indian Patent Application No. 202217000958 dated Mar. 15, 2022.

* cited by examiner

*Primary Examiner* — John E Uselding
(74) *Attorney, Agent, or Firm* — Morgan, Lewis & Bockius LLP

(57) ABSTRACT

The present invention relates to: an amino silicone polymer composition comprising hydroxyl-terminated polysiloxane, amino silane, and alkyl alkoxy silane; a silicone emulsion comprising same, showing excellent conditioning effects, and having excellent environment-friendliness; and a method for manufacturing same.

16 Claims, No Drawings

AMINO SILICONE POLYMER, SILICONE EMULSION COMPRISING SAME, AND METHOD FOR MANUFACTURING SAME

TECHNICAL FIELD

The present invention relates to an amino silicone polymer, a silicone emulsion comprising same, showing excellent conditioning effects, and having excellent environment-friendliness, and a method for manufacturing same.

BACKGROUND ART

Since a silicone resin does not interfere with skin respiration and imparts persistent gloss and shine when used in hair due to a small change in viscosity according to a temperature change and excellent permeability to oxygen, carbon dioxide, and the like, the silicone resin has been widely used as a raw material in various cosmetic fields such as a hair cleansing agent or cosmetics. At this time, the silicone resin has been typically used in the form of an emulsion dispersed in an organic solvent or water.

The silicone emulsion is generally manufactured in an oil/water (O/W) emulsion form by adding silicone gum having a high viscosity, an emulsifier, a neutralizing agent, water, and the like. In particular, the silicone emulsion has effects for preventing damage to the hair and protecting the damaged hair to improve the glossiness, a combing effect, and the like on the hair, and has excellent persistency and storage stability, and thus, has been widely used as a raw material for a cosmetic composition.

In this regard, in Japanese Patent Publication No. 2000-178358 (Patent Document 1), there is disclosed a silicone emulsion comprising an aqueous emulsion of hydroxyl-terminated polyorganosiloxane prepared by basic aqueous emulsion polymerization of low-molecular weight polyorganosiloxane and a product of a basic catalytic condensation reaction of amino-functional silane. As described above, the silicone emulsion of Patent Document 1 manufactured by the emulsion polymerization method contains at least 1 wt % of cyclic siloxane by an equilibrium reaction. However, there is a problem that the silicone emulsion containing at least 1 wt % of cyclic siloxane is difficult to be used as a raw material for cosmetics due to problems of toxicity and residuality.

Therefore, it is necessary to research and develop a silicone emulsion having excellent feeling of use and persistency as conditioning effects, and excellent environment-friendliness, and a method for manufacturing the same.

DISCLOSURE

Technical Problem

Therefore, an object of the present invention is to provide a silicone emulsion having excellent feeling of use and persistency as conditioning effects, comprising a small amount of cyclicsiloxane, and having excellent environment-friendliness without containing methanol, a method for manufacturing same, and an amino silicone polymer included in the silicone emulsion.

Technical Solution

The present invention provides an amino silicone polymer composition comprising hydroxyl-terminated polysiloxane, amino silane, and alkyl alkoxy silane represented by the following Chemical Formula 1:

$$R^1_{4-n}Si(OR^2)_n \qquad \text{[Chemical Formula 1]}$$

Wherein, $R^1$ and $R^2$ are each independently $C_{1-10}$ alkyl groups, and n is 2 to 3.

Further, the present invention provides an amino silicone polymer manufactured from the amino silicone polymer composition and having a viscosity at 25° C. of 10,000 to 100,000 cP.

Further, the present invention provides a silicone emulsion comprising the amino silicone polymer, a solvent, a non-ionic emulsifier, and a cationic emulsifier.

Further, the present invention provides a method for manufacturing a silicone emulsion comprising the steps: preparing a first mixture by mixing a first solvent and a non-ionic emulsifier;

preparing a second mixture by mixing the first mixture and an amino silicone polymer; and preparing a third mixture by mixing the second mixture and a cationic emulsifier and adding a neutralizing agent and a second solvent, wherein the steps are performed at 15° C. to 30° C., respectively.

Advantageous Effects

According to the present invention, the silicone emulsion has excellent environment-friendliness without containing methanol, excellent feeling of use and persistency as conditioning effects, and excellent storage stability at room temperature and high temperature. In addition, the silicone emulsion comprises a small amount of cyclicsiloxanes, octamethylcyclotetrsiloxane (D4) and decamethylcyclopentylsiloxane (D5) to have low irritation in human body. As a result, the silicone emulsion is very suitable as a raw material of a cosmetic composition.

Further, according to the present invention, the method for manufacturing the silicone emulsion is economic by preparing an amino silicone polymer with a high viscosity and then manufacturing the silicone emulsion using the same to easily manufacture the silicone emulsion at room temperature without heating.

Best Mode

Hereinafter, the present invention will be described in detail.

The 'weight average molecular weight' of the present invention may be measured by methods well-known in the art, and for example, may represent a value measured by a method such as gel permeation chromatograph (GPC) and the like.

Amino Silicone Polymer Composition

An amino silicone polymer composition according to the present invention comprises hydroxyl-terminated polysiloxane, amino silane, and alkyl alkoxy silane.

Hydroxyl-Terminated Polysiloxane

Hydroxyl-terminated polysiloxane as a main resin serves to improve low-temperature flexibility, high-temperature stability and weather resistance of a silicone emulsion comprising the same and serves to improve the slipiness by adjusting the surface tension of a coating film manufactured from the silicone emulsion.

The hydroxyl-terminated polysiloxane may be represented by the following Chemical Formula 2.

[Chemical Formula 2]

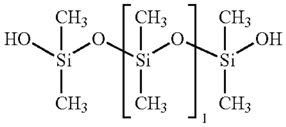

wherein, l is an integer of 1 to 1,000.

Specifically, in Chemical Formula 2 above, 1 may be an integer of 1 to 500, or an integer of 1 to 100. In Chemical Formula 2 above, when I is within the range, the slipiness, gloss and abrasion resistance of the silicone emulsion comprising the same are improved, and the conditioning effects on a damaged hair are excellent.

In addition, the hydroxyl-terminated polysiloxane may have the viscosity at 25° C. of 1 to 5,000 cP, 1 to 1,000 cP, or 1 to 200 cP. When the viscosity at 25° C. of the hydroxyl-terminated polysiloxane is within the range, the reaction rate of the hydroxyl-terminated polysiloxane when preparing the amino silicone polymer may be increased.

The hydroxyl-terminated polysiloxane may have the weight average molecular weight (Mw) of 100 to 50,000 g/mol, 500 to 10,000 g/mol, or 800 to 5,000 g/mol. When the weight average molecular weight of the hydroxyl-terminated polysiloxane is within the range, there is an effect that it is easy to prepare the amino silicone polymer.

In addition, the polymerization degree of the hydroxyl-terminated polysiloxane may be 1 to 1000, 1 to 100, 1 to 50, or 20 to 30. When the polymerization degree of the hydroxyl-terminated polysiloxane is within the range, the viscosity and the molecular weight of the polymer may obtain desired physical properties, and there is an effect that the reaction rate when preparing the amino silicone polymer using the same is fast and an economic effect is excellent.

The hydroxyl-terminated polysiloxane may include a hydroxyl group in 0.1 to 30 wt %, 0.1 to 10 wt %, or 0.1 to 5 wt % based on the total weight of the hydroxyl-terminated polysiloxane. When the content of the hydroxyl group is within the range, the hydroxyl-terminated polysiloxane has an effect that the reaction rate when preparing the amino silicone polymer is fast.

Amino Silane

Amino silane has an effect of introducing an amine functional group to the hydroxyl-terminated polysiloxane to impart a soft feeling of use to the amino silicone polymer.

The amino silane may be aminoalkoxy silane, and specifically, may be represented by the following Chemical Formula 3.

[Chemical Formula 3]

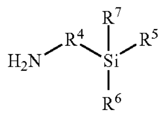

Wherein, $R^4$ is a $C_{1-5}$ alkylene group, and $R^5$, $R^6$ and $R^7$ are each independently $C_{1-5}$ alkyl groups or $C_{1-5}$ alkoxy groups.

Specifically, in Chemical Formula 3, the $R^4$ may be methylene ($-CH_2-$), 1,2-ethylene ($-CH_2CH_2-$), 1,1-ethylene ($-CH(CH_3)-$), 1,1-propylene ($-CH(CH_2CH_3)-$), 1,2-propylene ($-CH_2CH(CH_3)-$), 1,3-propylene ($-CH_2CH_2CH_2-$) 2,4-butylene ($-CH_2(CH_3)CH_2CH_2-$) or 1,4-butylene ($-CH_2CH_2CH_2CH_2-$).

In addition, the $R^5$, $R^6$ and $R^7$ may be each independently alkoxy groups such as methoxy, ethoxy, n-butoxy, or iso-butoxy, or alkyl groups such as methyl, ethyl, n-propyl, iso-propyl or n-butyl alkyl.

The amino silane may be included in the composition in the content of 1 to 10 parts by weight or 3 to 7 parts by weight with respect to 100 parts by weight of the hydroxyl-terminated polysiloxane. When the content of the amino silane is within the range, it is possible to prepare a polymer having a desired amine content, protect the damaged hair when manufacturing the emulsion using the polymer, and show excellent conditioning effects.

Alkylalkoxy Silane

Alkylalkoxy silane promotes a polymer synthesis reaction to lengthen a polymer chain and serves to prepare an amino silicone polymer having a high viscosity in the same reaction time.

The alkylalkoxy silane may be represented by the following Chemical Formula 1.

[Chemical Formula 1]

$$R^1_{4-n}Si(OR^2)_n$$

Wherein, $R^1$ and $R^2$ are each independently $C_{1-10}$ alkyl groups, and n is 2 to 3.

Specifically, $R^1$ and $R^2$ may be each independently methyl, ethyl, n-butyl, or iso-butyl, more specifically, methyl or ethyl.

In addition, the alkylalkoxy silane may be included in the composition in the content of 0.1 to 1 part by weight or 0.3 to 0.7 part by weight with respect to 100 parts by weight of the hydroxyl-terminated polysiloxane. When the content of the alkylalkoxy silane is within the range, there is an effect that it is possible to prepare the amino silicone polymer with a desired viscosity within the reaction time.

First Additive

The amino silicone polymer composition may further comprise a first additive such as a catalyst and a neutralizing agent. At this time, the first additive may be included in the composition in the content of 0.1 to 5 parts by weight or 0.5 to 2.5 parts by weight with respect to 100 parts by weight of the hydroxyl-terminated polysiloxane.

The catalyst refers to a basic compound capable of inducing a condensation reaction, and may be, for example, a basic catalyst. For example, the catalyst may include sodium hydroxide, potassium hydroxide, calcium hydroxide, and the like. At this time, the catalyst may be included in the composition in the content of 0.1 to 4 parts by weight or 0.5 to 2 parts by weight with respect to 100 parts by weight of the hydroxyl-terminated polysiloxane.

In addition, the neutralizing agent serves to adjust the pH of the amino silicone polymer composition, and may be used without a particular limitation so long as being a pH adjusting agent that may be commonly used in preparation of silicone. For example, the neutralizing agent may include any organic acid or inorganic acid, such as citric acid, acetic acid, lactic acid, formic acid, nitric acid, glycolic acid, and phosphoric acid. At this time, the neutralizing agent may be included in the composition in the content of 0.01 to 3 parts by weight or 0.1 to 1 part by weight with respect to 100 parts by weight of the hydroxyl-terminated polysiloxane.

Amino Silicone Polymer

Further, the amino silicone polymer according to the present invention is prepared from the amino silicone polymer composition as described above, and the viscosity at 25° C. may be 10,000 to 100,000 cP.

The amino silicone polymer may include 100 to 1,000 ppm or 200 to 600 ppm of octamethylcyclotetrasiloxane (D4) and 10 to 900 ppm or 10 to 700 ppm of decamethylcyclopentasiloxane (D5) with respect to the total weight of the polymer. When the content of D4 and D5 of the amino silicone polymer is within the range, there is an effect or reducing the irritation in human body of the silicone emulsion.

In addition, the amino silicone polymer does not include methanol to have environment-friendliness.

Specifically, the amino silicone polymer may have the viscosity at 25° C. of 10,000 to 90,000 cP or 10,000 to 80,000 cP. When the viscosity at 25° C. of the amino silicone polymer is within the range, it is possible to manufacture an emulsion with excellent adsorption in the hair and excellent conditioning effects on the damaged hair.

In addition, the amino silicone polymer may have a weight average molecular weight (Mw) of 50,000 to 200,000 g/mol or 50,000 to 150,000 g/mol. When the weight average molecular weight of the amino silicone polymer is within the range, the adsorption in the hair is excellent, thereby effectively imparting the gloss and softness to the hair.

Silicone Emulsion

Further, the silicone emulsion according to the present invention comprises the amino silicone polymer described above, a solvent, a non-ionic emulsifier, and a cationic emulsifier.

Amino Silicone Polymer

The amino silicone polymer as a main resin of the silicone emulsion has a dispersed phase which is dispersed in a solvent. At this time, the amino silicone polymer imparts a feeling of use and persistency, which are conditioning effects on the silicone emulsion.

The amino silicone polymer may have the physical properties and features as described above.

In addition, the amino silicone polymer may be included in the silicone emulsion in the content of 25 to 40 parts by weight or 28 to 35 parts by weight with respect to 100 parts by weight of the silicone emulsion. When the content of the amino silicone polymer is within the range, there is an effect that it is easy to manufacture an emulsion having small sizes of dispersed particles and excellent stability.

Solvent

The solvent is a dispersion medium in which the amino silicone polymer is dispersed, and serves to improve the workability by adjusting the viscosity of the silicone emulsion.

At this time, the solvent may be water, and specifically, may include one or more selected from the group consisting of deionized water, pure water, ultrapure water and distilled water.

In addition, the solvent may be included in the silicone emulsion in the content of 50 to 70 parts by weight or 55 to 65 parts by weight with respect to 100 parts by weight of the silicone emulsion. When the content of the solvent is within the range, there is an effect that the viscosity of the silicone emulsion comprising the same is appropriate and the stability is improved.

Non-Ionic Emulsifier

The non-ionic emulsifier serves to impart the emulsibility to the silicone emulsion.

The non-ionic emulsifier may be used without a particular limitation so long as being non-ionic surfactants or non-ionic emulsifiers commonly used in the silicone emulsion, and may include, for example, polyoxyethylene alkyl ether, polyoxyethylene arylalkyl ether, polyoxyalkylene alkyphenol ether, polyoxyalkylene aryl ester, polyoxyalkylene sorbic acid alkyl ester, sodium lauryl ether sulfate, stearyl trimethyl ammonium chloride, and the like. At this time, the polyoxyethylene alkyl ether may have 3 to 23 carbon atoms, and the aryl of the polyoxyethylene arylalkyl ether may have 6 to 10 carbon atoms, and the alkyl thereof may have 3 to 23 carbon atoms. In addition, the alkylene of the polyoxyalkylene alkylphenol ether may have 2 to 5 carbon atoms, and the alkyl thereof may have 3 to 23 carbon atoms. In addition, the alkylene of the polyoxyalkylene aryl ether may have 2 to 5 carbon atoms, and the aryl thereof may have 6 to 10 carbon atoms. In addition, the alkylene of the polyoxyalkylene sorbic acid alkyl ester may have 2 to 5 carbon atoms, and the alkyl thereof may have 3 to 23 carbon atoms.

In addition, the non-ionic emulsifier may have the hydrophilic lipophilic balance (HLB) value of 1 to 20, the weight average molecular weight (Mw) of 10 to 5,000 g/mol, and the viscosity at 25° C. of 1 to 5,000 cP. Specifically, the non-ionic emulsifier may have the HLB value of 5 to 15, the Mw of 100 to 1,500 g/mol, and the viscosity at 25° C. of 1 to 500 cP. When the HLB value of the non-ionic emulsifier is within the range, there is an effect that it is easy to manufacture the emulsion which is well emulsified and has excellent stability.

The non-ionic emulsifier may be included in the silicone emulsion in the content of 1 to 10 parts by weight or 1 to 5 parts by weight with respect to 100 parts by weight of the silicone emulsion. When the content of the non-ionic emulsifier is within the range, there is an effect that the emulsification is easy and the emulsifying stability of the emulsion is improved.

Cationic Emulsifier

The cationic emulsifier serves to impart the emulsibility to the silicone emulsion.

The cationic emulsifier may be used without a particular limitation so long as being cationic surfactants or cationic emulsifiers commonly used in the silicone emulsion, and may include, for example, a quaternary ammonium salt. The quaternary ammonium salt may include, for example, dicetyldimethyl ammonium chloride, cetrimonium chloride, behentrimonium chloride, and the like.

In addition, the cationic emulsifier may have the amine content of 0.01 to 1 wt % based on the total weight of the cationic emulsifier, and the weight average molecular weight (Mw) of 10 to 10,000 g/mol. Specifically, the cationic emulsifier may have the amine content of 0.05 to 0.5 wt %, 0.1 to 0.3 wt %, or 0.15 to 0.25 wt % based on the total weight of the cationic emulsifier, and the weight average molecular weight of 10 to 800 g/mol, 10 to 500 g/mol, or 100 to 500 g/mol. When the amine content and the weight average molecular weight of the cationic emulsifier are within the ranges, there is an effect that the emulsification is easy and the stability of the emulsion is improved.

The cationic emulsifier may be included in the silicone emulsion in the content of 1 to 10 parts by weight or 2 to 10 parts by weight with respect to 100 parts by weight of the silicone emulsion. When the content of the cationic emulsifier is within the range, the emulsification of the silicone emulsion is easy and the dilution stability for the solvent and water is excellent.

Second Additive

The silicone emulsion may further comprise at least one second additive selected from the group consisting of a preservative and a neutralizing agent. At this time, the second additive may be included in the silicone emulsion in the content of 0.1 to 5 parts by weight or 0.1 to 1 part by weight with respect to 100 parts by weight of the silicone emulsion.

The preservative serves to prevent stability from being deteriorated by contaminating and deforming the silicone emulsion by microorganisms. Further, the preservative is not particularly limited as long as being preservatives commonly used in the silicone composition. For example, the preservative may include at least one selected from the group consisting of sodium benzoate, phenoxyethanol, hexanediol, propylene glycol, diazolidinyl urea, imidazolidinyl urea, quaternium-15, DMDM hydantoin, benzalkonium chloride, 2-bromo-2-nitro-propane-1,3-diol, dehydroacetic acid, 2-dichloro-benzyl alcohol, sodium hydroxymethyl-glycinate, triclosan, benzoic acid, chlorobenzoic acid, benzyl alcohol, benzyl formal, salicylic acid, sodium edetate, sorbic acid, calcium benzoate, methyl benzoate and benzyl benzoate.

In addition, the neutralizing agent serves to adjust the pH of the silicone emulsion, and may be used without a particular limitation so long as being pH adjusting agents that may be commonly used in the silicone composition. For example, the neutralizing agent may include any organic acid or inorganic acid, such as citric acid, acetic acid, lactic acid, formic acid, nitric acid, glycolic acid, and phosphoric acid.

The silicone emulsion may have an average particle size of dispersed particles of 50 to 400 nm or 100 to 270 nm. When the average particle size of the particles dispersed in the silicone emulsion is within the range, there is an effect that the storage stability of the emulsion is improved and the coating is uniformly performed on the coating surface during the coating.

In addition, the silicone emulsion may have the viscosity at 25° C. of 1 to 500 cP, 1 to 100 cP, or 1 to 50 cP. When the viscosity at 25° C. of the silicone emulsion is within the range, there is an effect that the storage stability of the emulsion is improved.

Furthermore, the silicone emulsion may have the solid content of 30 to 50 wt % or 35 to 55 wt % based on the total weight of the silicone emulsion. When the solid content of the silicone emulsion is within the range, there is an effect of improving the storage stability of the emulsion and improving the feeling of use and persistency as the conditioning effects.

As described above, the silicone emulsion according to the present invention has excellent environment-friendliness without containing methanol, excellent feeling of use and persistency as conditioning effects, and excellent storage stability at room temperature and high temperature. In addition, the silicone emulsion includes a small amount of D4 and D5 to have significantly small irritation in human body. As a result, the silicone emulsion is very suitable as a raw material of the cosmetic composition.

Method for Manufacturing Silicone Emulsion

A method for manufacturing a silicone emulsion according to the present invention comprises the steps of: preparing a first mixture by mixing a first solvent and a non-ionic emulsifier; preparing a second mixture by mixing the first mixture and an amino silicone polymer; and preparing a third mixture by mixing the second mixture and a cationic emulsifier and adding a neutralizing agent and a second solvent, wherein the steps are performed at 15° C. to 30° C., respectively.

Specifically, the method for manufacturing the silicone emulsion may comprise preparing an amino silicone polymer with a high viscosity and mixing the amino silicone polymer with a solvent, a non-ionic emulsifier, a cationic emulsifier, and the like. As described above, in the case of the preparing the amino silicone polymer with the high viscosity and mixing the amino silicone polymer with other components, the mixing may be performed at room temperature so that an economic effect is improved, and the silicone emulsion manufactured therefrom has excellent storage stability at room temperature and high temperature.

Step of Preparing First Mixture

In this step, the first mixture is prepared by mixing the first solvent and the non-ionic emulsifier.

The first solvent is as described in the solvent of the silicone emulsion, and the non-ionic emulsifier is as described in the silicone emulsion.

At this time, the first solvent may be mixed in the content of 0.5 to 5 parts by weight or 0.5 to 3 parts by weight with respect to 100 parts by weight of the silicone emulsion.

In addition, the mixing may be used without a particular limitation so long as being methods commonly used for manufacturing the emulsion, and for example, may be stirring using a mixer and an impeller.

This step may be performed at 15° C. to 30° C., or at room temperature (e.g., 20° C. to 25° C.)

Step of Preparing Second Mixture

In this step, the second mixture is prepared by mixing the first mixture and the amino silicone polymer.

The amino silicone polymer is as described above, and for example, may be prepared by reacting a composition comprising hydroxyl-terminated polysiloxane, amino silane, and alkylalkoxy silane represented by the following Chemical Formula 1 at 80° C. to 95° C.

$$R^1_{4-n}Si(OR^2)_n \quad \text{[Chemical Formula 1]}$$

Wherein, $R^1$ and $R^2$ are each independently alkyl groups having 1 to 10 carbon atoms, and n is 2 to 3.

Specifically, the amino silicone polymer may be prepared by a method comprising the steps of preparing a reactant by mixing hydroxyl-terminated polysiloxane, amino silane, and alkylalkoxy silane represented by Chemical Formula 1 above at 80° C. to 95° C. or 85° C. to 95° C. and adding a catalyst to react with the mixture; and cooling the reactant to 35° C. to 45° C. for 1 hr to 10 hr or 3 hr to 9 hr and adding a neutralizing agent. At this time, the reactant may have the viscosity at 80° C. to 95° C. of 10,000 to 100,000 cP.

The specific examples and the contents of the hydroxyl-terminated polysiloxane, the amino silane, the alkylalkoxy silane, the catalyst, and the neutralizing agent are as described in the amino silicone polymer composition.

Further, the second mixture may be a form in which the amino silicone polymer is dispersed in the first mixture, and at this time, the average particle size of the dispersed particles may be 50 to 400 nm or 100 to 270 nm.

Step of Preparing Third Mixture

In this step, the third mixture is prepared by mixing the second mixture and a cationic emulsifier and adding a neutralizing agent and a second solvent.

The cationic emulsifier and the neutralizing agent are as described in the silicone emulsion, and the second solvent is as described in the solvent of the silicone emulsion.

In addition, the second solvent may be included in the content of 1 to 10 parts by weight or 3 to 8 parts by weight with respect to 100 parts by weight of the silicone emulsion.

This step may be performed at 15° C. to 30° C., or at room temperature (e.g., 20° C. to 25° C.)

Further, the manufacturing method may further comprise a step of manufacturing a silicone emulsion by adding a third solvent to the third mixture.

At this time, the third solvent is as described in the solvent of the silicone emulsion.

In addition, the third solvent may be included in the content of 45 to 68 parts by weight or 55 to 65 parts by weight with respect to 100 parts by weight of the silicone emulsion. At this time, the third solvent may also be added one time or several times.

This step may be performed at 15° C. to 30° C., or at room temperature (e.g., 20° C. to 25° C.)

As described above, the method for manufacturing the silicone emulsion according to the present invention is economic by preparing the amino silicone polymer with the high viscosity and then manufacturing the silicone emulsion using the same to easily manufacture the silicone emulsion at room temperature without heating.

Modes for the Invention

Hereinafter, the present invention will be described in more detail through Examples. However, these Examples are just to help in the understanding of the present invention and the scope of the present invention is not limited to these Examples in any meaning.

EXAMPLES

Example 1. Manufacture of Silicone Emulsion 1-1: Preparation of Amino Silicone Polymer In a reactor, 95.18 parts by weight of hydroxyl-terminated polysiloxane was added, raised to 95° C. and stirred for 30 minutes. Thereafter, 3 parts by weight of first amino silane and 0.32 part by weight of methyltriethoxy silane ware added and 1 part by weight of 20 wt % of a NaOH aqueous solution as a catalyst was added for 10 minutes. Thereafter, the viscosity was checked and the mixture was cooled to 40° C. for 5 hours when reaching a target viscosity (25,000 cP) and added with 0.5 part by weight of acetic acid as a neutralizing agent to be neutralized to prepare an amino silicone polymer.

The prepared amino silicone polymer had the viscosity at 25° C. of 25,000 cP and the weight average molecular weight of 80,000 g/mol.

1-2: Manufacture of Silicone Emulsion (Room Temperature Stirring)

In a reactor, a homomixer mounted with an impeller was provided, and 1.5 parts by weight of deionized water (first solvent) as a solvent and 2.5 parts by weight of a non-ionic emulsifier were added and stirred at 25° C. for 20 minutes. Thereafter, 32 parts by weight of an amino silicone polymer of Example 1-1 was slowly added for 80 minutes. After the addition of the amino silicone polymer was completed, the particle size of the dispersed particles was measured every 30 minutes and the mixture was stirred at 25° C. for 90 minutes. When the average particle size of the dispersed particles reached less than 270 nm, 2 parts by weight of a cationic emulsifier was added and stirred. Thereafter, 0.3 parts by weight of 23 wt % of an acetic acid aqueous solution as a neutralizing agent was added and stirred at 25° C. for 30 minutes. Thereafter, 5 parts by weight of deionized water (second solvent) was added and stirred at 25° C. for 30 minutes, and then parts by weight of deionized water (third solvent) was added and stirred at 25° C. for 30 minutes. Thereafter, 20 parts by weight of deionized water (fourth solvent) was added and stirred at 25° C. and then 16.7 parts by weight of deionized water (fifth solvent) was added and stirred at 25° C. to manufacture a silicone emulsion. At this time, the stirring rate was kept constant at 500 rpm.

Examples 2 to 13 and Comparative Examples 1 to 4

Manufacture of Silicone Emulsions

The silicone emulsions were manufactured in the same manner as in Example 1, except for using components in compositions as described in Tables 1 to 3 and adjusting a temperature and a cooling time when preparing an amino silicone polymer.

TABLE 1

| (Parts by weight) | | Example 1 | Example 2 | Example 3 | Example 4 | Example 5 | Example 6 |
|---|---|---|---|---|---|---|---|
| Amino silicone polymer | Hydroxyl-terminated polysiloxane | 30.46 | 30.46 | 30.46 | 30.46 | 30.46 | 30.46 |
| | Cyclosiloxane | — | — | — | — | — | — |
| | First amino silane | 0.96 | 0.96 | 0.96 | 2 | 2 | 0.96 |
| | Methyltriethoxy silane | 0.1 | 0.1 | 0.1 | 0.1 | 0.2 | 0.1 |
| | Catalyst | 0.32 | 0.32 | 0.32 | 0.32 | 0.32 | 0.32 |
| | Neutralizing agent | 0.16 | 0.16 | 0.16 | 0.22 | 0.22 | 0.16 |
| Deionized water | | 63.2 | 63.2 | 63.2 | 62.1 | 62.0 | 57.5 |
| Non-ionic emulsifier | | 2.5 | 2.5 | 2.5 | 2.5 | 2.5 | 4 |
| Cationic emulsifier | | 2 | 2 | 2 | 2 | 2 | 6 |
| Neutralizing agent | | 0.3 | 0.3 | 0.3 | 0.3 | 0.3 | 0.5 |
| Total | | 100 | 100 | 100 | 100 | 100 | 100 |
| Viscosity (cP) at 25° C. of amino silicone polymer | | 25,000 | 10,000 | 80,000 | 40,000 | 80,000 | 25,000 |

TABLE 1-continued

| (Parts by weight) | Example 1 | Example 2 | Example 3 | Example 4 | Example 5 | Example 6 |
|---|---|---|---|---|---|---|
| Temperature (° C.) when preparing amino silicone polymer | 95 | 95 | 95 | 95 | 95 | 95 |
| Cooling time (hr) when preparing amino silicone polymer | 5 | 3 | 9 | 3 | 5 | 5 |

TABLE 2

| (Parts by weight) | | Example 7 | Example 8 | Example 9 | Example 10 | Example 11 | Example 12 | Example 13 |
|---|---|---|---|---|---|---|---|---|
| Amino silicone polymer | Hydroxyl-terminated polysiloxane | 30.46 | 30.46 | 30.46 | 30.46 | 30.46 | 30.46 | 30.46 |
| | First amino silane | 0.96 | 0.96 | 0.96 | 0.96 | 0.96 | 0.28 | 3.09 |
| | Methyltriethoxy silane | 0.2 | 0.1 | — | 0.02 | 0.35 | 0.1 | 0.1 |
| | Dimethyldiethoxy silane | — | — | 0.1 | — | — | — | — |
| | Catalyst | 0.32 | 0.32 | 0.32 | 0.32 | 0.32 | 0.32 | 0.32 |
| | Neutralizing agent | 0.16 | 0.16 | 0.16 | 0.16 | 0.16 | 0.16 | 0.16 |
| Deionized water | | 57.4 | 55 | 63.2 | 63.2 | 63.2 | 63.2 | 61.2 |
| Non-ionic emulsifier | | 4 | 2.7 | 2.5 | 2.5 | 2.25 | 2.28 | 2.37 |
| Cationic emulsifier | | 6 | 10 | 2 | 2.08 | 2 | 2 | 2 |
| Neutralizing agent | | 0.5 | 0.3 | 0.3 | 0.3 | 0.3 | 1.2 | 0.3 |
| Total | | 100 | 100 | 100 | 100 | 100 | 100 | 100 |
| Viscosity (cP) at 25° C. of amino silicone polymer | | 35,000 | 15,000 | 10,000 | 5,000 | 150,000 | 7,000 | 120,000 |
| Temperature (° C.) when preparing amino silicone polymer | | 95 | 90 | 95 | 95 | 95 | 95 | 95 |
| Cooling time (hr) when preparing amino silicone polymer | | 5 | 5 | 5 | 5 | 5 | 5 | 5 |

TABLE 3

| (Parts by weight) | | Comparative Example 1 | Comparative Example 2 | Comparative Example 3 | Comparative Example 4 |
|---|---|---|---|---|---|
| Amino silicone polymer | Hydroxyl-terminated polysiloxane | — | — | — | 30.46 |
| | Cyclosiloxane | 35 | 32 | 32 | — |
| | First amino silane | — | — | — | 0.96 |
| | Second amino silane | 2 | 1 | 0.92 | — |
| | Trimethylethoxy silane | — | — | — | 0.1 |
| | Catalyst | 0.4 | 0.5 | 0.1 | 0.32 |
| | Neutralizing agent | — | — | — | 0.16 |
| Deionized water | | 54.67 | 60 | 52.83 | 63.2 |
| Non-ionic emulsifier | | 2.8 | 3 | 2.76 | 2.5 |
| Cationic emulsifier | | 1.83 | 2.5 | 10.39 | 2 |
| Neutralizing agent | | 3.3 | 1 | 1 | 0.3 |
| Total | | 100 | 100 | 100 | 100 |
| Viscosity (cP) at 25° C. of amino silicone polymer | | 5,000 | 5,000 | 5,000 | 4,000 |
| Temperature (° C.) when preparing amino silicone polymer | | 95 | 95 | 90 | 95 |
| Cooling time (hr) when preparing amino silicone polymer | | 4 | 5 | 9 | 5 |

The manufacturers and product names of respective components used in Comparative Examples and Examples were shown in Table 4.

TABLE 4

| Component | Manufacturer and Product name | Note |
|---|---|---|
| Hydroxyl-terminated polysiloxane | Manufacturer: KCC, Product name: HEO-60 | Viscosity at 25° C.: 60 cP, Polymerization degree: 25, Mw: 2,000 g/mol, OH content: 1.8 to 2 wt % |
| Cyclosiloxane | Manufacturer: KCC, Product name: Octamethyl cyclotetrasiloxane | Mw: 296 g/mol |
| First amino silane | Manufacturer: SHINETSU, Product name: KBE-903 | Aminopropylmethyldiethoxy silane |
| Second amino silane | Manufacturer: SHINETSU, Product name: KBM-603 | Aminoethylaminopropyltrimethoxy silane |
| Non-ionic emulsifier | Manufacturer: HANNONG CHEMICALS, Product name: TDE12 | Tridecyl polyoxyethylene ether (HLB value: 14, Mw: 720 g/mol, Viscosity at 25° C.: 200 cP) |
| Cationic emulsifier | Manufacturer: Miwon Chemicals, Product name: CTAC29 | Cetrimonium chloride (Amine content: 0.2 wt %, Solid content: 29 wt %, Mw: 320 g/mol) |
| Cationic surfactant | Manufacturer: Akzonobel, Product name: ARQUAD16-29 | — |
| Non-ionic surfactant | Manufacturer: Croda, Product name: RENEX 30 | — |

Test Examples: Characteristic Evaluation of Silicone Emulsion

The physical properties of the silicone emulsions of Examples 1 to 13 and Comparative Examples 1 to 4 were measured by the following methods and the results were shown in Tables 5 and 6.

(1) Average Particle Size of Dispersed Particles

The average particle size (nm) of dispersed particles in the silicone emulsion was measured using Master Size 3000 of Marvern Co., Ltd.

(2) Viscosity

The viscosity at 25° C. was measured by using a Brookfiled viscometer and helipath stand #93 while stirring the silicone emulsion at 2.5 rpm.

(3) Storage Stability (Room Temperature)

While the silicone emulsion was left for 7 days in a 25° C. oven, the appearance of the silicone emulsion was observed to determine whether a water layer and an oil layer were separated and the high-temperature stability was evaluated. At this time, when the layer separation of the water layer and the oil layer did not occur, the room temperature stability was evaluated as good, and when the layer separation occurred within 7 days, the elapsed date when the layer separation of the water layer and the oil layer occurred was recorded.

(4) Storage Stability (High Temperature)

While the silicone emulsion was left for 7 days in a 50° C. oven, the appearance of the silicone emulsion was observed to determine whether a water layer and an oil layer were separated and the high-temperature stability was evaluated. At this time, when the layer separation of the water layer and the oil layer did not occur, the high-temperature stability was evaluated as good, and when the layer separation occurred within 7 days, the elapsed date when the layer separation of the water layer and the oil layer occurred was recorded.

(5) Contents of D4, D5 and Methanol

The contents of octamethylcyclotetrasiloxane (D4), decamethylcyclopentasiloxane (D5), and methanol in the silicone emulsion were measured using a gas chromatograph/mass spectrometer (GC/MS). At this time, when the content of the compound was less than a threshold of the meter, the content was represented as N.D.

(6) Feeling of Use

The silicone emulsion was diluted in water so as to be a concentration of 2.0 wt % to manufacture a sample. Thereafter, after the sample was used for 10 testers, the feeling of use was evaluated based on adhesion and a coating property and evaluated based on a five-point scale.

(7) Persistency

After the same sample as item (6) was used for the same testers, the persistency was evaluated and evaluated based on a five-point scale.

TABLE 5

| | Example 1 | Example 2 | Example 3 | Example 4 | Example 5 | Example 6 | Example 7 | Example 8 | Example 9 |
|---|---|---|---|---|---|---|---|---|---|
| Viscosity (cP) | 20 | 16 | 25 | 20 | 20 | 21 | 19 | 18 | 17 |
| Particle size (nm) | 210 | 200 | 250 | 210 | 185 | 183 | 180 | 175 | 200 |
| Storage stability (room temperature) | Good | Good | Good | Good | Good | Good | Good | Good | Good |
| Storage stability (high temperature) | Good | Good | Good | Good | Good | Good | Good | Good | Good |
| D4 content (ppm) | 471 | 242 | 430 | 400 | 420 | 425 | 471 | 480 | 450 |
| D5 content (ppm) | 580 | 40 | 600 | 550 | 560 | 570 | 580 | 590 | 580 |
| Methanol content (ppm) | N.D. | N.D. | N.D. | N.D. | N.D. | N.D. | N.D. | N.D. | N.D. |

TABLE 5-continued

| | Example 1 | Example 2 | Example 3 | Example 4 | Example 5 | Example 6 | Example 7 | Example 8 | Example 9 |
|---|---|---|---|---|---|---|---|---|---|
| Feeling of use | 4 | 3.8 | 4.3 | 4.5 | 4.7 | 4.1 | 4 | 4.2 | 4.1 |
| Persistency | 4 | 3.7 | 4.7 | 4.5 | 4.7 | 4.2 | 4 | 4.5 | 4 |

TABLE 6

| | Example 10 | Example 11 | Example 12 | Example 13 | Comparative Example 1 | Comparative Example 2 | Comparative Example 3 | Comparative Example 4 |
|---|---|---|---|---|---|---|---|---|
| Viscosity (cP) | 20 | 35 | 25 | 30 | 17 | 16 | 16 | 19 |
| Particle size (nm) | 190 | 250 | 200 | 300 | 200 | 160 | 180 | 180 |
| Storage stability (room temperature) | Good | Good | Good | Good | Good | Good | Good | Good |
| Storage stability (high temperature) | Good days | 7 days | Good days | 7 days | 5 days | 5 | 6 | Good |
| D4 content (ppm) | 400 | 460 | 380 | 420 | 8,565 | 8,565 | 7,929 | 450 |
| D5 content (ppm) | 550 | 590 | 530 | 500 | 949 | 949 | 957 | 520 |
| Methanol content (ppm) | N.D. | N.D. | N.D. | N.D. | 1,243 | 1,243 | 1,096 | N.D. |
| Feeling of use | 3.6 | 3.7 | 3.6 | 3.9 | 3.5 | 3.4 | 3.4 | 3.0 |
| Persistency | 3.7 | 3.8 | 3.8 | 3.8 | 3.7 | 3.4 | 3.2 | 3.1 |

As shown in Tables 5 and 6, in the silicone emulsions of Examples 1 to 13, the storage stability at room temperature and high temperature was excellent, a small amount of D4 and D5 was contained and methanol was not contained to have environment-friendliness and low irritation in human body, and the feeling of use and persistency were excellent.

On the other hand, in the silicone emulsions of Comparative Examples 1 to 3, a large amount of D4 and D5 was contained and methanol was contained to have low environment-friendliness and high irritation in human body, and the storage stability at room temperature and high temperature was low. In addition, in the silicone emulsion of Comparative Example 4 comprising trimethylethoxy silane, the feeling of use and persistency were lack.

The invention claimed is:

1. An amino silicone polymer prepared from an amino silicone polymer composition, the amino silicone polymer composition comprising hydroxyl-terminated polysiloxane, amino silane, and alkyl alkoxy silane represented by the following Chemical Formula 1:

[Chemical Formula 1]

$$R^1_{4-n}Si(OR^2)_n$$

in which $R^1$ and $R^2$ are each independently $C_{1-10}$ alkyl groups, and n is 2 to 3, wherein the hydroxyl-terminated polysiloxane includes a hydroxyl group in 0.1 to 5 wt % based on the total weight of the hydroxyl-terminated polysiloxane, and the amino silicone polymer includes 100 to 1,000 ppm of octamethylcyclotetrasiloxane and 10 to 900 ppm of decamethylcyclopentasiloxane with respect to the total weight of the polymer.

2. The amino silicone polymer composition of claim 1, wherein the composition comprises 100 parts by weight of the hydroxyl-terminated polysiloxane, 1 to 10 parts by weight of the amino silane, and 0.1 to 1 part by weight of the alkyl alkoxy silane.

3. The amino silicone polymer composition of claim 1, wherein the hydroxyl-terminated polysiloxane has a viscosity at 25° C. of 1 to 5,000 cP, a weight average molecular weight of 100 to 50,000 g/mol, and a polymerization degree of 1 to 1,000.

4. A silicone emulsion comprising an amino silicone polymer prepared from the amino silicone polymer composition of claim 1, a solvent, a non-ionic emulsifier, and a cationic emulsifier.

5. The silicone emulsion of claim 4, wherein the silicone emulsion comprises 25 to 40 parts by weight of the amino silicone polymer, 50 to 70 parts by weight of the solvent, 1 to 10 parts by weight of the non-ionic emulsifier, and 1 to 10 parts by weight of the cationic emulsifier.

6. The amino silicone polymer composition of claim 1, wherein the composition further comprises a first additive comprising at least one selected from a group of a catalyst and a neutralizing agent.

7. The amino silicone polymer composition of claim 6, wherein the first additive is present in the content of 0.1 to 5 parts by weight with respect to 100 parts by weight of the hydroxyl-terminated polysiloxane.

8. The amino silicone polymer composition of claim 6, wherein the catalyst comprises at least one selected from the group consisting of sodium hydroxide, potassium hydroxide, and calcium hydroxide.

9. The amino silicone polymer composition of claim 8, wherein the catalyst is present in the composition in the content of 0.1 to 4 parts by weight with respect to 100 parts by weight of the hydroxyl-terminated polysiloxane.

10. The amino silicone polymer composition of claim 6, wherein the neutralizing agent comprises at least one selected from the group consisting of citric acid, acetic acid, lactic acid, formic acid, nitric acid, glycolic acid, and phosphoric acid.

11. The amino silicone polymer composition of claim 10, wherein the neutralizing agent is present in the content of 0.01 to 3 parts by weight of with respect to 100 parts by weight of the hydroxyl-terminated polysiloxane.

12. The amino silicone polymer of claim 1, wherein the silicone polymer does not include methanol.

13. The amino silicone polymer of claim 1, wherein the silicone polymer has a viscosity at 25° C. of 10,000 to 90,000 cP.

14. The amino silicone polymer of claim 1, wherein the silicone polymer has a weight average molecular weight of 50,000 to 200,000 g/mol.

15. The silicone emulsion of claim 4, wherein the silicone emulsion has a viscosity at 25° C. of 1 to 500 cP.

16. The amino silicone polymer composition of claim 6, wherein the neutralizing agent comprises organic acid.

* * * * *